UNITED STATES PATENT OFFICE.

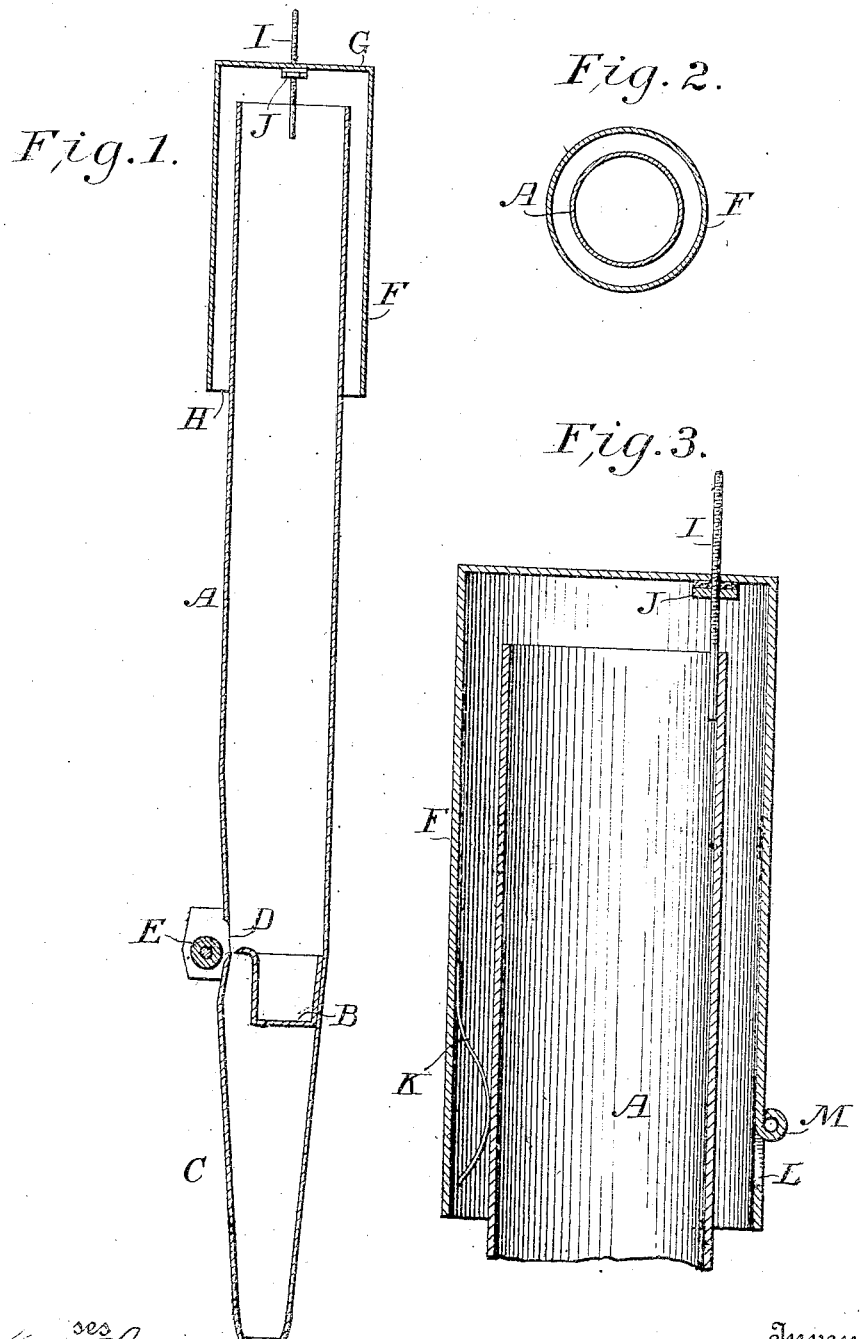

WILLIAM E. HASKELL, OF BRATTLEBORO, VERMONT, ASSIGNOR TO ESTEY ORGAN COMPANY, OF BRATTLEBORO, VERMONT, A CORPORATION OF VERMONT.

ORGAN-PIPE WITH QUALIFYING-TUBE.

965,897.

Specification of Letters Patent.   Patented Aug. 2, 1910.

Application filed March 8, 1909. Serial No. 482,147.

*To all whom it may concern:*

Be it known that I, WILLIAM E. HASKELL, of Brattleboro, in the county of Windham and State of Vermont, have invented certain new and useful Improvements in Organ-Pipes With Qualifying-Tubes, of which the following is a specification.

The special objects of the present improvements are to enable pipes to be made of low pitch with less height than common, and to qualify the tone.

A metal organ-pipe embodying the present improvements is illustrated in the accompanying drawings, wherein:—

Figure 1, is a longitudinal section of the organ pipe. Fig. 2, is a cross-section. Fig. 3, is a longitudinal section of the upper end of the pipe on an enlarged scale and in a plane at right angles to that of Fig. 1.

The pipe has a cylindrical body A, open at its top and its lower end may be constructed in any of the ways common in the construction of metal pipes. As shown, it has a bottom B, a foot C, a mouth D, and a bridge E, as in Letters Patent of the United States No. 871,272, dated November 19, 1907. These illustrated features are, however, simply typical of one variety of metal pipes.

The characteristic feature of the present invention is the cylindrical qualifying tube F, which has a closed top G, and an open bottom H. This qualifying tube is of greater diameter than the pipe body A, and surrounds the pipe body and incloses the open upper end thereof. The upper ends of the body and tube are in communication with each other. Owing to the greater diameter of the qualifying tube, a free space is provided between the tube and the body A, which space is open at the bottom and in free communication with the external air and which communicates at the top with the interior of said body.

The qualifying tube is adjustably supported on the pipe body by means of a screw threaded stem I, which is suitably secured to the upper end of the pipe body by soldering or otherwise and which extends through a hole in the top G. This screw threaded stem I, carries an adjustable nut J, padded on its upper surface, upon which pad the underside of the top G, rests. The nut J, can be adjusted on the screw I, thereby governing the distance of the top G, above the open top of the body A. A spring K, soldered on the interior of the cylindrical portion of the qualifying tube bears against the exterior of the body A, and prevents any objectionable movement of the qualifying tube. Near its lower open end H, the qualifying tube is provided with any suitable adjusting device for regulating the pitch, such as a tuning slit L, and tuner M, such as are frequently used in tuning metal pipes. Certain characteristics of this construction are important. The area in cross-section of the annular space between the interior of the qualifying tube and the exterior of the body should be equal to the area in cross-section of the interior of the body. The height of the lower side of the top G, above the plane of the top of the body A, should be approximately one-third the interior diameter of the body A. The qualifying tube is shown as concentric with the pipe body A, but this is not essential.

A pipe of this construction has a pitch lower than that of the length of the body A. Its pitch is equal to that of an open pipe of a length equal to the vertical distance between the bottom B, and the top G, plus the vertical distance between the top G, and the open bottom H, of the qualifying tube F, the effective opening at the bottom being determined by the tuner M. This characteristic is important since it enables pipes of low pitch to be employed in situations which would not admit the employment of open pipes of the necessary length to give the desired low tone. The qualifying tube may be carried down almost to the mouth D, of the pipe, thus giving a desirable low pitch which could only be obtained by an open pipe of nearly double the length.

The qualifying tube of the character shown has a qualifying effect on the character of the tone produced, it not being the same character as that produced by that of the pipe shown if the qualifying tube were removed. Hence, the qualifying tube not only lowers the pitch but varies the character of the tone. By appropriate voicing such as shown it is feasible, for example, to obtain a tone similar to that of the clarinet, which tone has heretofore being produced in organ pipes only by the employment of a vibrating reed.

While the improvement is shown in connection with round metal pipes with a round qualifying tube of the same metal, other shapes may be employed, and the same principles of construction can be employed in wood pipes.

I claim:—

1. A metal organ pipe having a cylindrical open top body and an open bottom qualifying tube surrounding the same at its upper end, said qualifying tube being cylindrical in cross-section and having a closed flat top, the area of the space between the interior of the qualifying tube and the exterior of the body being substantially equal to the internal area of the body, and the distance between the top of the qualifying tube and the open top of the body being substantially one-third of the internal diameter of the body.

2. A metal organ pipe having an open top body and a qualifying tube surrounding the same at its upper end, said qualifying tube having an opening below its top and a closed flat top, the area of the space between the interior of the qualifying tube and the exterior of the body being substantially equal to the internal area of the body, and the distance between the top of the qualifying tube and the open top of the body being substantially one-third of the internal diameter of the body.

3. A metal organ pipe having an open body with a vertical screw threaded stem carrying an adjustable nut, and a qualifying tube with a closed top and an open bottom surrounding said body having an aperture in its top through which said screw threaded stem extends, whereby the closed top of the qualifying tube rests upon the nut.

4. A metal organ pipe having an open top body and a surrounding qualifying tube with closed top fitting over the top of said body, said qualifying tube having a tuner at its lower open end.

5. An organ pipe having an open top body and a qualifying tube surrounding the same at its upper end, said qualifying tube having a closed flat top and an opening below its top, the area of the space between the interior of the qualifying tube and the exterior of the body being substantially equal to the internal area of the body, and the qualifying tube communicating with the open top of the body.

6. An organ pipe having an open body and a qualifying tube with a closed top and an open bottom surrounding said body and adjustably supported thereon, said qualifying tube being of greater diameter than the body, whereby a free space is provided between said tube and body which is open to the external air at the bottom and communicates at the top with the interior of said body.

7. An organ pipe having an open top body and a surrounding qualifying tube with closed top, said qualifying tube having a tuner at its lower open end.

8. An organ pipe having an open top body and a surrounding qualifying tube with closed top fitting over the top of said body, said qualifying tube being of greater diameter than the body, whereby a free space is provided between said tube and body which is open to the external air at the bottom and communicates at the top with the interior of said body.

In witness whereof, I have hereunto signed my name in the presence of two subscribing witnesses.

WILLIAM E. HASKELL.

Witnesses:
L. W. HAWLEY,
C. N. MORAN.